United States Patent
Yoshihara et al.

(10) Patent No.: US 10,612,601 B2
(45) Date of Patent: Apr. 7, 2020

(54) GREASE COMPOSITION FOR CONSTANT VELOCITY JOINTS AND CONSTANT VELOCITY JOINT CHARGED WITH THE GREASE COMPOSITION

(71) Applicants: KYODO YUSHI CO., LTD., Fujisawa-shi, Kanagawa (JP); NTN CORPORATION, Osaka-shi, Osaka (JP)

(72) Inventors: Michitaka Yoshihara, Fujisawa (JP); Yuji Onuki, Suzuka (JP); Mika Kohara, Iwata (JP); Shinichi Takabe, Iwata (JP)

(73) Assignees: KYODO YUSHI CO., LTD., Fujisawa-Shi, Kanagawa (JP); NTN CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 15/101,236

(22) PCT Filed: Dec. 4, 2014

(86) PCT No.: PCT/JP2014/082154
§ 371 (c)(1),
(2) Date: Jun. 2, 2016

(87) PCT Pub. No.: WO2015/083804
PCT Pub. Date: Jun. 11, 2015

(65) Prior Publication Data
US 2016/0305488 A1 Oct. 20, 2016

(30) Foreign Application Priority Data

Dec. 4, 2013 (JP) .................................. 2013-251366

(51) Int. Cl.
*C10M 175/00* (2006.01)
*C10M 169/04* (2006.01)
(Continued)

(52) U.S. Cl.
CPC ......... *F16D 3/2245* (2013.01); *C10M 169/06* (2013.01); *C10M 2201/041* (2013.01);
(Continued)

(58) Field of Classification Search
CPC .............. C10M 133/28; C10M 133/44; C10M 2215/182; C10M 115/08
(Continued)

(56) References Cited

U.S. PATENT DOCUMENTS 3,197,405 A * 7/1965 Le Suer .................. C07F 9/165
252/400.21
5,190,682 A * 3/1993 Harris .................. C10M 107/02
508/121

(Continued)

FOREIGN PATENT DOCUMENTS

EP 0767237 A1 4/1997
JP 2-20597 A 1/1990
(Continued)

OTHER PUBLICATIONS

International Search Report (PCT/ISA/210) dated Feb. 3, 2015, by the Japanese Patent Office as the International Searching Authority for International Application No. PCT/JP2014/082154.
(Continued)

*Primary Examiner* — Prem C Singh
*Assistant Examiner* — Francis C Campanell
(74) *Attorney, Agent, or Firm* — Buchanan, Ingersoll & Rooney PC

(57) ABSTRACT

The invention provides a grease composition for constant velocity joints, which contains (a) a base oil, (b) a diurea
(Continued)

thickener, (c) benzotriazole and/or a derivative thereof, and (d) a phosphate and/or an amine salt thereof; and a constant velocity joint where the grease composition is packed.

15 Claims, 1 Drawing Sheet

(51) Int. Cl.
*F16D 3/2245* (2011.01)
*C10M 169/06* (2006.01)
*F16D 3/223* (2011.01)

(52) U.S. Cl.
CPC . *C10M 2203/1025* (2013.01); *C10M 2207/40* (2013.01); *C10M 2215/04* (2013.01); *C10M 2215/08* (2013.01); *C10M 2215/1026* (2013.01); *C10M 2215/223* (2013.01); *C10M 2219/068* (2013.01); *C10M 2223/04* (2013.01); *C10M 2223/043* (2013.01); *C10N 2210/02* (2013.01); *C10N 2230/06* (2013.01); *C10N 2230/12* (2013.01); *C10N 2240/046* (2013.01); *C10N 2250/10* (2013.01); *F16D 3/223* (2013.01); *F16D 2300/06* (2013.01)

(58) Field of Classification Search
USPC .................................. 508/111, 280
See application file for complete search history.

(56) References Cited

U.S. PATENT DOCUMENTS

| | | | |
|---|---|---|---|
| 5,604,187 A | 2/1997 | Takeuchi et al. | |
| 5,854,183 A | 12/1998 | Hasegawa et al. | |
| 7,988,361 B1 | 8/2011 | Natsuhiko et al. | |
| 8,132,965 B2 | 3/2012 | Mori et al. | |
| 8,772,210 B2 | 7/2014 | Baum | |
| 2005/0133407 A1* | 6/2005 | Abernathy | C10M 169/04 208/18 |
| 2005/0209115 A1 | 9/2005 | Kinoshita et al. | |
| 2008/0182770 A1* | 7/2008 | Ramsey | C10M 137/04 508/423 |
| 2009/0247441 A1 | 10/2009 | Baum | |
| 2009/0281008 A1* | 11/2009 | Fujinami | C10M 169/02 508/154 |
| 2010/0173807 A1 | 7/2010 | Nagumo et al. | |
| 2011/0021391 A1* | 1/2011 | E | C10M 169/00 508/165 |
| 2011/0057527 A1 | 3/2011 | Mori et al. | |
| 2011/0118158 A1* | 5/2011 | Shishikura | C10M 141/10 508/272 |
| 2013/0345101 A1* | 12/2013 | Imai | C10M 169/02 508/100 |

FOREIGN PATENT DOCUMENTS

| | | |
|---|---|---|
| JP | 9-100488 A | 4/1997 |
| JP | 9-255983 A | 9/1997 |
| JP | 9-296196 A | 11/1997 |
| JP | 10-121080 A | 5/1998 |
| JP | 2002-20776 A | 1/2002 |
| JP | 2003-82374 A | 3/2003 |
| JP | 2003-321693 A | 11/2003 |
| JP | 2006-335876 A | 12/2006 |
| JP | 2008-297402 A | 12/2008 |
| JP | 2011-236354 A | 11/2011 |
| WO | WO 98/17748 A1 | 4/1998 |

OTHER PUBLICATIONS

Written Opinion (PCT/ISA/237) dated Feb. 3, 2015, by the Japanese Patent Office as the International Searching Authority for International Application No. PCT/JP2014/082154.
Extended Search Report issued by the European Patent Office in corresponding European Patent Application No. 14867039.1 dated Jun. 12, 2017 (7 pages).
The First Office Action issued by the State Intellectual Property Office of People's Republic of China in corresponding Chinese Patent Application No. 201480066124.8 dated Feb. 12, 2018 (14 pages including partial English translation).
Liping et al.: "Tribological Synergy Study of a Benzotrizole Derivative and Tricresyl Phosphate," Lubrication Engineering, vol. 34, No. 5, pp. 34-37, May 2009 (12 pages including partial English translation).
Office Action issued by the China National Intellectual Property Administration in corresponding Chinese Patent Application No. 201480066124.8 dated Dec. 7, 2018 (8 pages).

* cited by examiner

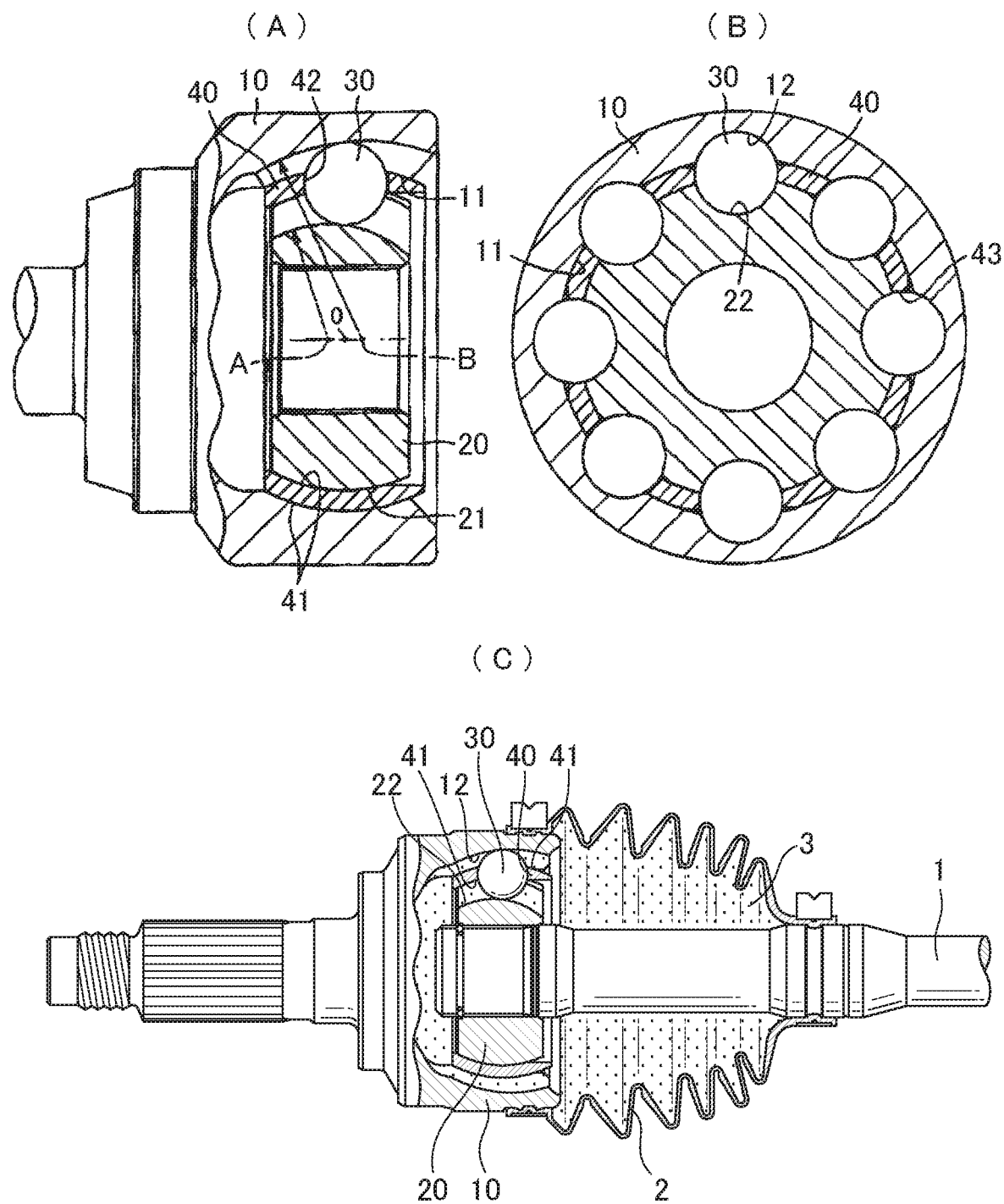

GREASE COMPOSITION FOR CONSTANT VELOCITY JOINTS AND CONSTANT VELOCITY JOINT CHARGED WITH THE GREASE COMPOSITION

TECHNICAL FIELD

The present invention relates to a grease composition for constant velocity joints and the constant velocity joint charged with the grease composition.

BACKGROUND ART

In the current automobile industry, the tendencies are toward higher engine power, and smaller size and lighter weight to ensure the living space in the car, and the production of front-engine front-drive (FF) vehicles is therefore increasing. In the FF vehicles, it is required that the engine power be transmitted to the front wheels smoothly. The constant velocity joint becomes an essential part to transmit the rotational motion to the two shafts at a constant velocity even if the two shafts intersect at any angle.

The constant velocity joint continues a complicated rolling—sliding motion under a high contact pressure while rotating. A stress is repeatedly applied to the lubrication portion which is in contact with the metal member, so that further improvement of the antiwear properties and the anti-flaking properties under the severe lubrication conditions has been demanded.

There is known a grease composition (for example, as in JP 2002-20776 A) capable of reducing wear of the constant velocity joint, in particular, the ball-type constant velocity joint, to prevent the flaking problem, which comprises an overbased sodium sulfonate, a sulfur-containing extreme-pressure agent such as molybdenum dialkyl dithiocarbamate or the like, and a phosphorus-containing antiwear agent.

There is also known a grease composition for constant velocity joints (for example, as in JP 2006-335876 A) capable of effectively reducing wear and friction of the joint to prevent the vibration from occurring, which comprises melamine cyanurate and molybdenum dithiocarbamate.

A grease composition comprising an alicyclic or aromatic diurea, melamine cyanurate, molybdenum disulfide and a sulfur-containing extreme-pressure agent free from phosphorus is also known (for example, as in JP Hei 09-255983 A), which can optimize wear of the constant velocity joint to prevent the flaking problem, and at the same time, exhibit excellent heat-resistance.

A grease composition as disclosed in JP 2008-297402 A comprises diurea, zinc dialkyldithiophosphate, molybdenum-dialkyldithiocarbamate, zinc dialkyldithiocarbamate, and a sulfur-nitrogen based extreme-pressure agent for improving the flaking problem of the constant velocity joint.

A grease composition for the ball-type constant velocity joint as disclosed in JP 2011-236354 A comprises a diurea thickener, a base oil, zinc dialkyldithiophosphate, molybdenum dialkyldithiocarbamate, melamine cyanurate, calcium carbonate, zinc dialkyldithiocarbamate, and a sulfur-nitrogen based extreme-pressure agent for improving the antiwear properties under a high contact pressure to increase the anti-flaking properties.

A grease composition as disclosed in JP 2003-82374 A comprises a base oil, a diurea compound and benzotriazole and/or a derivative thereof, which grease composition is not designed for the constant velocity joint, but is capable of extend the flaking life of a lubricated steel portion subject to the rolling motion and the rolling—sliding motion.

However, the antiwear properties and the anti-flaking properties that can be obtained by the above-mentioned grease compositions are not considered to be sufficient.

SUMMARY OF INVENTION

Technical Problem

An object of the invention is to provide a grease composition for constant velocity joints which is excellent in the antiwear properties and the anti-flaking properties; and a constant velocity joint charged with the above-mentioned grease composition.

Solution to Problem

The inventors of the present invention have paid attention to the point that excellent antiwear properties and anti-flaking properties of the grease are advantageous when the grease is used in the constant velocity joint. The inventors have thus extensively researched to develop a grease composition for constant velocity joints that can exhibit excellent antiwear properties and anti-flaking properties. More specifically, the inventors searched for a composition having improved antiwear properties by measuring the diameter of scar on the test ball as a result of the four-ball extreme pressure test. At the same time, a composition that can improve the anti-flaking properties has been explored by using the real constant velocity joint and checking the frequency of occurrence of the flaking problem during a predetermined duration of driving.

Consequently, the inventors found that it becomes possible to obtain a grease composition for constant velocity joints, having the improved antiwear properties and anti-flaking properties by incorporating as the additives benzotriazole and/or a derivative thereof and a phosphate and/or an amine salt thereof into a base grease containing a diurea thickener.

Namely, the invention provides a grease composition and a constant velocity joint charged with the grease composition, as shown below.

1. A grease composition for constant velocity joints, comprising the following components (a) to (d):
   (a) a base oil,
   (b) a diurea thickener,
   (c) benzotriazole and/or a derivative thereof, and
   (d) a phosphate and/or an amine salt thereof.

2. The grease composition for constant velocity joints described in the above-mentioned item 1, wherein the benzotriazole and/or the derivative thereof (c) is represented by the following formula (1), (2) or (3):

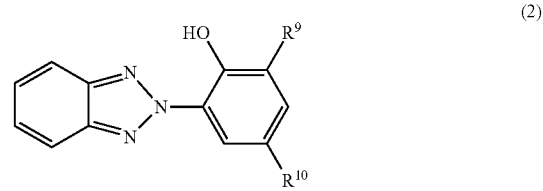

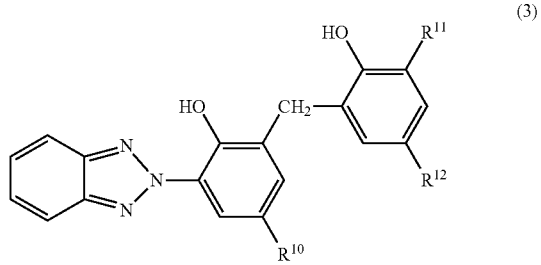

(3)

wherein R[1] is a hydrogen atom, a halogen atom, an alkyl group having 1 to 18 carbon atoms, or COOR[2] where R[2] is a hydrogen atom or an alkyl group having 1 to 18 carbon atoms;
R[3] is a hydrogen atom, a halogen atom, CH$_2$CH$_2$COOH, CH$_2$CH(OH)CH$_2$OH, CH(COOH)CH$_2$COOH, CH$_2$CH(COOH)CH$_2$COOH, NR[4]OH, CH$_2$NR[5]R[6] or CH$_2$N(R[7]OH)R[8]OH where R[4] to R[6] are each independently a hydrogen atom or an alkyl group having 1 to 18 carbon atoms, and R[7] and R[8] are each independently an alkyl group having 1 to 18 carbon atoms;
R[9] and R[10] are each independently a hydrogen atom or an alkyl group having 1 to 18 carbon atoms:
R[11] is a hydrogen atom, an alkyl group having 1 to 18 carbon atoms, or N$_3$C$_6$H$_4$; and
R[12] is a hydrogen atom or an alkyl group having 1 to 18 carbon atoms.

3. The grease composition for constant velocity joints described in the above-mentioned item 1 or 2, wherein the benzotriazole and/or the derivative thereof (c) is contained in an amount of 0.2 to 20 mass % based on the total mass of the composition.

4. The grease composition for constant velocity joints described in any one of the above-mentioned items 1 to 3, wherein the phosphate and/or the amine salt thereof (d) is contained in an amount of 0.05 to 10 mass % based on the total mass of the composition.

5. A constant velocity joint charged with the grease composition for constant velocity joints described in any one of the above-mentioned items 1 to 4.

Effects of Invention

The grease composition of the invention can exhibit excellent antiwear properties and anti-flaking properties. The constant velocity joint of the invention is excellent in the resistance to wear and the resistance to flaking because the above-mentioned grease composition is packed therein.

BRIEF DESCRIPTION OF THE DRAWING

FIG. 1(A) is a longitudinal section of a fixed type constant velocity joint using balls as the rolling elements where the grease composition of the invention may preferably be charged.

FIG. 1(B) is a cross section of the fixed type constant velocity joint of FIG. 1(A).

FIG. 1(C) is a partial cutaway sectional view of the fixed type constant velocity joint of FIG. 1(A).

DESCRIPTION OF EMBODIMENTS

One embodiment of a constant velocity joint where the grease composition of the invention is preferably charged will now be explained by referring to FIG. 1.

FIG. 1 illustrates a fixed type constant velocity joint using balls as the rolling elements. As shown in FIGS. 1(A), 1(B) and 1(C), the fixed type constant velocity joint using balls as the rolling elements comprises an outer joint member 10, an inner joint member 20, a ball 30 and a cage 40. Eight curved track grooves 12 are disposed on a spherical inner surface 11 of the outer joint member 10 at intervals of 45°. Also, eight curved track grooves 22 are disposed on a spherical outer surface 21 of the inner joint member 20 at intervals of 45°. The center of curvature A formed by the inner joint member track groove 22 and the center of curvature B formed by the outer joint member track groove 12 are offset in the right and left directions at equal distances from the center (O) of angular displacements of the joint. When the angle made by the outer joint member 10 and the inner joint member 20 is displaced by θ°, the torque transmitting ball 30 guided by the cage 40 is constantly retained on a plane at an angle of θ/2 formed by bisecting the angle θ°, which ensures the constant velocity of the joint as well known.

The ball 30 is set between the outer joint member track groove 12 and the inner joint member track groove 22; and the cage 40 is inserted between the outer joint member 10 and the inner joint member 20. The cage 40 has spherical surfaces 41 on the outer and the inner sides thereof, which spherical surfaces 41 are brought into contact with the spherical inner surface 11 of the outer joint member 10 and the spherical outer surface 21 of the inner joint member 20, and guided by those surfaces 11 and 21. The cage 40 also has eight pockets 43 for holding the balls 30 therein, with the pockets 43 being arranged at regular intervals in the circumferential direction of the cage 40.

The shaft 1 is fitted into the inner joint member 20. The shaft 1 is enclosed with boots 2, which also surround the circumference of the outer joint member 10. A space thus created by the outer joint member 10, the inner joint member 20, the outer joint member track groove 12, the inner joint member track groove 22, the torque transmitting balls 30, the cage 40 and the shaft 1 is filled with a grease 3 according to the invention. Although the fixed type constant velocity joint has eight balls in the embodiment of FIG. 1, the grease of the invention can apply to various kinds of constant velocity joints equipped with any number of balls, for example, three to ten.

The balls 30 move along the track grooves 12 and 22. The movement of the balls cause the flaking problem even under normal conditions when the operation continues for an extended period of time. In this case, the area where the flaking occurs is relatively small and the flaking is slight. However, some conditions may accelerate the wear of joint and the balls 30 may run onto the edge portions (not shown) of the track grooves 12 and 22 to cause the flaking problem. In this case, the area of each flaking tends to be relatively large.

(a) Base Oil

Any base oil including paraffin or naphthene type mineral oils can be used in the invention. Not only the mineral oils, but also hydrocarbon synthetic oils such as poly α-olefins (PAO), polybutene, alkylnaphthalene, alkylbenzene, ethylene—α-olefin co-oligomers and the like; ester type synthetic oils such as diesters, polyol esters, aromatic esters and the like; ether type synthetic oils such as polyalkylene glycol, polyethylene glycol, polypropylene glycol, alkyl diphenyl ethers, and the like; silicone oils; fluorinated oils, and the like can be used. Those base oils may be used alone or in combination.

The mineral oil, synthetic hydrocarbon oil, ester type synthetic oil, or the mixture thereof is preferably used as the base oil in the invention. More preferably, the mineral oil, in particular, the paraffin type mineral oil is preferred.

The kinematic viscosity of the base oil may be within the viscosity range of the general lubricating oils. The base oil may preferably have a kinematic viscosity at 40° C. of 50 to 330 mm²/s, more preferably 80 to 200 mm²/s. The kinematic viscosity at 100° C. may preferably be in the range of 2 to 50 mm²/s, more preferably 4 to 20 mm²/s.

When the kinematic viscosities of the base oil are too high at 40° C. and 100° C., the low-temperature characteristics may be adversely affected depending on the viscosity index. For example, the kinematic viscosity may become high at low temperatures, to increase the internal resistance to stirring, whereby the load torque may be abnormal. The parameter to ensure the sufficient oil film strongly depends on the kinematic viscosity of the base oil. Therefore, when the kinematic viscosities at 40° C. and 100° C. are too low, a sufficient oil film may not be formed and the life determined by rolling fatigue may become shorter.

(b) Diurea Thickener

The diurea thickener of the component (b) can be represented by the following formula (4):

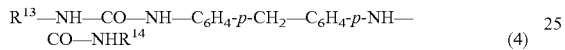

(4)

wherein $R^{13}$ and $R^{14}$, which may be the same or different from each other, independently represent one group selected from the group consisting of straight-chain or branched alkyl groups having 7 to 20 carbon atoms, preferably 8 to 18 carbon atoms, aryl groups having 6 to 12 carbon atoms, preferably 6 to 7 carbon atoms, and cycloalkyl groups having 6 to 12 carbon atoms, preferably 6 to 7 carbon atoms.

The diurea thickener of the formula (4) where $R^{13}$ and $R^{14}$ are each independently a straight-chain or branched alkyl group having 8 to 20 carbon atoms, preferably 8 to 18 carbon atoms is preferable.

The diurea thickener of the formula (4) where $R^{13}$ and $R^{14}$ are each independently a straight-chain alkyl group having 8 to 18 carbon atoms is more preferable.

The diurea thickener of the formula (4) where $R^{13}$ and $R^{14}$ are both a straight-chain alkyl group having 8 carbon atoms is most preferable.

The above-mentioned diurea thickener is obtainable by reacting a predetermined diisocyanate with a predetermined monoamine. One preferable specific example of the diisocyanate is diphenylmethane-4,4'-diisocyanate. Examples of the monoamine include aliphatic amine compounds, aromatic amine compounds, alicyclic amine compounds and the mixtures thereof. Specific examples of the aliphatic amine compounds include alkylamines having 8 to 18 carbon atoms, such as octylamine, dodecylamine, hexadecylamine, octadecylamine, and oleylamine. Specific examples of the aromatic amine compounds include aniline and p-toluidine. Specific examples of the alicyclic amine compounds include cyclohexylamine. The method of reacting the diisocyanate with the monoamine is not particularly limited, and any conventional methods can be used for the preparation.

The worked penetration of the grease composition according to the invention may preferably be 220 to 430, and more preferably 265 to 385 when determined in accordance with the JIS K2220 5.3. The worked penetration may be readily adjusted by controlling the amount of the above-mentioned component (b). More specifically, the component (b) may be contained in an amount of 1 to 25 mass %, preferably 4 to 15 mass %, based on the total mass of the composition.

(c) Benzotriazole and/or the Derivative Thereof

Generally, benzotriazole and/or the derivatives thereof are widely used as the corrosion inhibitor for copper and copper alloys, and also incorporated in the grease composition. In the present invention, the benzotriazole and/or derivatives thereof principally contribute to the improvement of the anti-flaking performance. The benzotriazole and/or the derivatives thereof represented by the following formulas (1), (2) and (3) are preferable as the component (c):

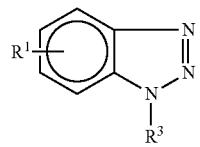

(1)

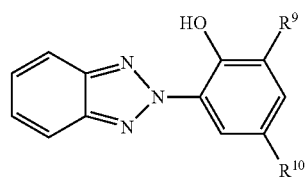

(2)

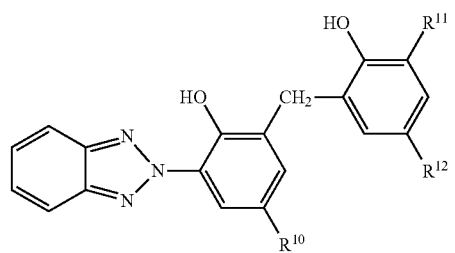

(3)

wherein $R^1$ is a hydrogen atom, a halogen atom, an alkyl group having 1 to 18 carbon atoms or $COOR^2$ where $R^2$ is a hydrogen atom or an alkyl group having 1 to 18 carbon atoms;

$R^3$ is a hydrogen atom, a halogen atom, $CH_2CH_2COOH$, $CH_2CH(OH)CH_2OH$, $CH(COOH)CH_2COOH$, $CH_2CH(COOH)CH_2COOH$, $NR^4OH$, $CH_2NR^5R^6$ or $CH_2N(R^7OH)R^8OH$ where $R^4$ to $R^6$ are each independently a hydrogen atom or an alkyl group having 1 to 18 carbon atoms, and $R^7$ and $R^8$ are each independently an alkyl group having 1 to 18 carbon atoms;

$R^9$ and $R^{10}$ are each independently a hydrogen atom or an alkyl group having 1 to 18 carbon atoms;

$R^{11}$ is a hydrogen atom, an alkyl group having 1 to 18 carbon atoms or $N_3C_6H_4$; and $R^{12}$ is a hydrogen atom or an alkyl group having 1 to 18 carbon atoms.

As the component (c), the compounds represented by the above formula (1) are preferable. More preferably used are the compounds represented by the formula (1) wherein $R^1$ is a hydrogen atom, a halogen atom or an alkyl group having 1 to 18 carbon atoms; and $R^3$ is a hydrogen atom, a halogen atom or $CH_2NR^5R^6$ in which $R^5$ and $R^6$ are each independently a hydrogen atom or an alkyl group having 1 to 18 carbon atoms. Also, more preferably used are the compounds represented by the formula (1) wherein $R^1$ and $R^3$ both represent a hydrogen atom, or $R^1$ represents an alkyl group having 1 to 18 carbon atoms and $R^3$ represents $CH_2NR^5R^6$ in which $R^5$ and $R^6$ are each independently an alkyl group having 1 to 18 carbon atoms. Particularly preferable are the compounds represented by the formula (1) wherein $R^1$ and $R^3$ both represent a hydrogen atom, or $R^1$ represents an alkyl group having 1 to 3 carbon atoms and $R^3$ represents $CH_2NR^5R^6$ in which $R^5$ and $R^6$ are each independently an alkyl group having 6 to 12 carbon atoms. Most preferably used are the compounds represented by the formula (1) wherein $R^1$ and $R^3$ both represent a hydrogen atom, or $R^1$ is methyl group and $R^3$ represents $CH_2NR^5R^6$ in which $R^5$ and $R^6$ both represent octyl group.

The benzotriazole and/or the derivative thereof may preferably be contained in an amount of 0.2 to 20 mass %, more preferably 0.5 to 10 mass %, and most preferably 1 to 5 mass %, based on the total mass of the composition. The content of less than 0.2 mass % may result in an insufficient effect. It is not cost-effective to increase the content to more than 20 mass % because the obtainable effect will be saturated.

(d) Phosphate and/or the Amine Salt Thereof

The phosphate and/or the amine salts thereof principally contribute to the improvement in the antiwear properties. The antiwear properties and the anti-flaking properties can be drastically upgraded by adding the phosphate and/or the amine salt thereof to the grease composition comprising the benzotriazole and/or the derivative thereof. Addition of the phosphate and/or the amine salt thereof has a much better effect on the antiwear properties when compared with the case where the conventional anti-wear agent such as zinc dialkyldithiocarbamate or the like is added. The phosphate and/or the amine salt thereof can exhibit more significant effect of increasing the antiwear properties than the extreme-pressure agent, oiliness improver, and solid lubricant, which have been evaluated as contributory to improvement of the wear resistance. The improved anti-wear properties can reduce the serious flaking problem which may result from the progress of wear.

The phosphate and/or the amine salts thereof used in the invention include phosphates, phosphites, hypophosphites, amine salts of acid phosphates, amine salts of acid phosphites, and amine salts of acid hypophosphites. In particular, phosphates, phosphites, acid phosphates, and amine salts of acid phosphates are preferred. As the phosphates, tricresyl phosphate (TCP) and trioctyl phosphate (TOP) are preferable. As the phosphites, triphenyl phosphite and triethyl phosphite are preferable. As the acid phosphates, diphenyl hydrogenphosphite and diethyl hydrogenphosphite are preferable.

With respect to the amine salts of acid phosphate, amine salts of the acid phosphate represented by formula (5) are preferred:

$$R^{15}O_APO(OH)_{3-A} \quad (5)$$

wherein $R^{15}$ is an alkyl group having 1 to 30 carbon atoms, preferably 1 to 18 carbon atoms, more preferably 1 to 8 carbon atoms, and most preferably 1 to 4 carbon atoms; and A is 1 or 2.

Examples of the amine for constituting the amine salt include straight-chain or branched monoalkylamines, dialkylamines and trialkylamines, cyclohexylamines, aromatic amines and the like.

In the composition of the invention, the component (d) may preferably be contained in an amount of 0.05 to 10 mass %, and more preferably 0.2 to 5 mass %, based on the total mass of the composition. The content of less than 0.05 mass % may result in an insufficient effect. It is not cost-effective to increase the content to more than 10 mass % because the obtainable effect will be saturated.

The grease composition of the invention may further comprise a sulfur-containing extreme-pressure agent in addition to the above-mentioned components (a) to (d). Addition of the sulfur-containing extreme-pressure agent can increase the extreme pressure properties, which can further improve the anti-flaking performance.

It is preferable to use the sulfur-containing extreme-pressure agent free from any phosphorus and metallic ingredients, and more preferable to use sulfurized oil, olefin sulfide and the like.

The sulfur-containing extreme-pressure agent may preferably be contained in an amount of 0.1 to 10 mass %, and more preferably 0.1 to 5 mass %, based on the total mass of the composition. When the content is less than 0.1 mass %, the sufficient effect may not be expected. It is not cost-effective to increase the content to more than 10 mass % because the obtainable effect will be saturated.

The grease composition of the invention may further comprise at least one selected from the group consisting of vegetable fats and oils, fatty acid amide waxes, and melamine cyanurate (MCA) in addition to the above-mentioned components (a) to (d). Such additives can serve as the oiliness improver to adsorb onto the metallic surface of the constant velocity joint and form a protective layer thereon, or as the solid lubricant to prevent metal-to-metal contact and reduce the heat generation.

The vegetable fats and oils, which are generally used as the oiliness improver for grease include soybean oil, rapeseed oil, sesame oil, olive oil, linseed oil, castor oil, palm oil and the like in the invention.

The fatty acid amide waxes, which are also generally used as the oiliness improver for grease include lauramide wax, stearamide wax, oleamide wax and mixtures thereof in the invention.

The above-mentioned melamine cyanurate is an organic adduct of melamine to (iso)cyanuric acid (approximately at the ratio of 1:1), which is usually incorporated into the grease as a solid lubricant.

In the group consisting of the vegetable fats and oils, fatty acid amide waxes, and MCA, the vegetable fats and oils, in particular, castor oil may preferably be used as the additive.

At least one kind of additive selected from the group consisting of the vegetable fats and oils, fatty acid amide waxes, and MCA may preferably be contained in an amount of 0.1 to 10 mass %, more preferably 0.1 to 5 mass %, and most preferably 0.25 to 1 mass %, based on the total mass of the composition. When the content is less than 0.1 mass %, the sufficient effect may not be expected. It is not cost-effective to increase the content to more than 10 mass % because the obtainable effect will be saturated.

According to one preferable embodiment of the invention, the grease composition may consist essentially of: (a) a paraffin type mineral oil; (b) a diurea thickener represented by the formula (4) wherein $R^{13}$ and $R^{14}$ both represent a straight-chain alkyl group having 8 carbon atoms; (c) a benzotriazole derivative represented by the formula (1) wherein $R^1$ is a hydrogen atom, a halogen atom or an alkyl group having 1 to 4 carbon atoms, and $R^3$ is a hydrogen atom, a halogen atom or $CH_2NR^5R^6$ in which $R^5$ and $R^6$ are each independently a hydrogen atom or an alkyl group having 1 to 8 carbon atoms; (d) an amine salt of an acid phosphate represented by the formula (5) wherein $R^{15}$ is an alkyl group having 1 to 4 carbon atoms, and A is 1 or 2; and an olefin sulfide, castor oil, and a rust inhibitor, with the worked penetration determined by the JIS K 2220 5.3 being in the range of 265 to 385. As the rust inhibitor, alkenylsuccinate anhydride is preferred.

Furthermore, in the above-mentioned embodiment, it is more preferable that the content of the component (c) is 1 to 5 mass %, the content of the component (d) is 0.2 to 5 mass %, and the content of the sulfur-containing extreme-pressure agent is 0.1 to 5 mass %, the content of the castor oil is 0.25 to 1 mass %, and the content of the rust inhibitor is 0.05 to 1 mass %.

The grease composition of the invention may further comprise the common additives, for example, the antioxidant, rust inhibitor, extreme-pressure agent, anti-wear agent such as zinc dialkyldithiocarbamate or the like, metal deactivator other than the component (c), corrosion inhibitor, and solid lubricant such as graphite or the like. When such auxiliary additives are added, the amounts of the additives may be adjusted within the range allowable in the typical grease compositions, and generally in the range of 0.0001 to 10 mass % based on the total mass of the grease composition. It is preferable that the grease composition of the invention be free of any molybdenum compound. The reasons for this are that the molybdenum compound increases the cost and decreases the versatility.

EXAMPLES

Preparation of Urea-Containing Base Grease

A mixture of 2000 g of a base oil and 250 g of diphenylmethane-4,4'-diisocyanate was placed into a container and heated to 70 to 80° C. Into another container, 2000 g of the base oil and 258 g of octylamine were placed and heated to 70 to 80° C., and the resultant mixture was then added to the first mixture to cause a reaction for 30 minutes with sufficiently stirring. The reaction mixture was then heated with stirring, and thereafter allowed to stand at room temperature, to obtain a urea-containing base grease.

To the base grease thus obtained, the additives shown in Tables 1 to 7 were added. With the base oil being appropriately added, the mixture was blended with a three roll mill to have a worked penetration of 325 (in accordance with the JIS K2220 5.3).

In the above, the following oil was used as the base oil:
Type: paraffin type mineral oil
Viscosity (40° C.): 100 mm$^2$/s, Viscosity (100° C.): 11 mm$^2$/s
Viscosity index: 94

In Tables 1 to 7, the numerals given in the columns corresponding to the components (a) to (d), sulfur-containing extreme-pressure agent, vegetable oil, fatty acid amide wax, MCA, zinc dialkyldithiocarbamate and graphite represent the amount ratio (mass %) based on the total mass of each grease composition.

Test Methods

The antiwear properties and the extreme pressure properties of the grease compositions shown in Tables 1 to 7 were evaluated by the four-ball extreme pressure test under the following conditions:
<Antiwear Properties> (Evaluated in Accordance with ASTM D 2596)
Load: 50 kg
Number of revolutions: 1770 rpm
Duration: 3 minutes
The antiwear properties were evaluated by measuring the scar diameter on the test ball after the test.
<Extreme Pressure Properties>
The last non-seizure load was determined in accordance with the ASTM D2596.
<Anti-Flaking Properties>
Each of the grease compositions shown in Tables 1 to 7 was charged into a practically used joint (a fixed type constant velocity joint using balls as the rolling elements). The joint was subjected to a durability test under the following conditions. After a predetermined duration of the running test, the joint was broken down to check the degree of flaking occurrence.
Conditions 1:
Number of revolutions: 200 rpm
Torque: 1000 N·m
Joint angle: 5°
Conditions 2:
Number of revolutions: 1500 rpm
Torque: 300 N·m
Joint angle: 5°
Degree of flaking occurrence
No flaking: A (acceptable)
A slight flaking occurred at two places or less: B (acceptable)
A slight flaking occurred at three places or more, but there was a track free of flaking: C (acceptable)
A serious flaking occurred or a slight flaking occurred on all the tracks: D (unacceptable)
<Resistance to Heat Generation>
Each of the grease compositions shown in Tables 1 to 7 was charged into a practically used joint (a fixed type constant velocity joint using balls as the rolling elements). The joint was subjected to a heat generation test under the following conditions. An increase in the surface temperature of the joint from the room temperature was measured.
Test conditions:
Number of revolutions: 500 rpm
Torque: 150 N·m
Joint angle: 50

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| (a) | Base oil | 92.75 | 92.60 | 92.75 | 92.60 | 92.75 | 92.60 | 92.75 | 92.60 | 92.75 | 92.60 |
| (b) | Diurea thickener | 7.00 | 7.00 | 7.00 | 7.00 | 7.00 | 7.00 | 7.00 | 7.00 | 7.00 | 7.00 |
| (c-1) | Benzotriazole (*1) | 0.20 | 0.20 | 0.20 | 0.20 | 0.20 | 0.20 | 0.20 | 0.20 | 0.20 | 0.20 |
| (c-2) | Benzotriazole derivative (*2) | — | — | — | — | — | — | — | — | — | — |
| (c-3) | Benzotriazole derivative (*3) | — | — | — | — | — | — | — | — | — | — |
| (c-4) | Benzotriazole derivative (*4) | — | — | — | — | — | — | — | — | — | — |
| (c-5) | Benzotriazole derivative (*5) | — | — | — | — | — | — | — | — | — | — |
| (c-6) | Benzotriazole derivative (*6) | — | — | — | — | — | — | — | — | — | — |
| (d-1) | Tricresyl phosphate (*7) | 0.05 | 0.20 | — | — | — | — | — | — | — | — |
| (d-2) | Trioctyl phosphate (*8) | — | — | 0.05 | 0.20 | — | — | — | — | — | — |
| (d-3) | Triphenyl phosphite (*9) | — | — | — | — | 0.05 | 0.20 | — | — | — | — |
| (d-4) | Triethyl phosphite (*10) | — | — | — | — | — | — | 0.05 | 0.20 | — | — |
| (d-5) | Acid phosphate I (*11) | — | — | — | — | — | — | — | — | 0.05 | 0.20 |

TABLE 1-continued

|  |  | Examples |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| (d-6) | Acid phosphate II (*12) | — | — | — | — | — | — | — | — | — | — |
| (d-7) | Amine salt of acid phosphate (*13) | — | — | — | — | — | — | — | — | — | — |
|  | S-containing extreme pressure agent I (*14) | — | — | — | — | — | — | — | — | — | — |
|  | S-containing extreme pressure agent II (*15) | — | — | — | — | — | — | — | — | — | — |
|  | Vegetable oil (*16) | — | — | — | — | — | — | — | — | — | — |
|  | Fatty acid amide wax (*17) | — | — | — | — | — | — | — | — | — | — |
|  | MCA (*18) | — | — | — | — | — | — | — | — | — | — |
| Antiwear properties | Scar diameter (mm) | 0.40 | 0.38 | 0.40 | 0.37 | 0.40 | 0.37 | 0.40 | 0.36 | 0.40 | 0.37 |
| Extreme pressure properties | L.N.S.L(N) | 784 | 784 | 784 | 784 | 784 | 784 | 784 | 784 | 784 | 784 |
| Anti-flaking properties | Condition 1 | C | C | C | C | C | C | C | C | C | C |
|  | Condition 2 | C | C | C | C | C | C | C | C | C | C |
| Resistance to heat generation | Increase in temp. from room temp. (° C.) | 54 | 52 | 52 | 53 | 51 | 54 | 53 | 52 | 51 | 52 |

TABLE 2

|  |  | Examples |  |  |  |  |  |  |  |  |  |
|---|---|---|---|---|---|---|---|---|---|---|---|
|  |  | 11 | 12 | 13 | 14 | 15 | 16 | 17 | 18 | 19 | 20 |
| (a) | Base oil | 92.75 | 92.60 | 92.75 | 92.60 | 91.80 | 87.80 | 92.60 | 91.80 | 87.80 | 92.50 |
| (b) | Diurea thickener | 7.00 | 7.00 | 7.00 | 7.00 | 7.00 | 7.00 | 7.00 | 7.00 | 7.00 | 7.00 |
| (c-1) | Benzotriazole (*1) | 0.20 | 0.20 | 0.20 | 0.20 | 1.00 | 5.00 | — | — | — | — |
| (c-2) | Benzotriazole derivative (*2) | — | — | — | — | — | — | 0.20 | 1.00 | 5.00 | — |
| (c-3) | Benzotriazole derivative (*3) | — | — | — | — | — | — | — | — | — | 0.20 |
| (c-4) | Benzotriazole derivative (*4) | — | — | — | — | — | — | — | — | — | — |
| (c-5) | Benzotriazole derivative (*5) | — | — | — | — | — | — | — | — | — | — |
| (c-6) | Benzotriazole derivative (*6) | — | — | — | — | — | — | — | — | — | — |
| (d-1) | Tricresyl phosphate (*7) | — | — | — | — | — | — | — | — | — | — |
| (d-2) | Trioctyl phosphate (*8) | — | — | — | — | — | — | — | — | — | — |
| (d-3) | Triphenyl phosphite (*9) | — | — | — | — | — | — | — | — | — | — |
| (d-4) | Triethyl phosphite (*10) | — | — | — | — | — | — | — | — | — | — |
| (d-5) | Acid phosphate I (*11) | — | — | — | — | — | — | — | — | — | — |
| (d-6) | Acid phosphate II (*12) | 0.05 | 0.20 | — | — | — | — | — | — | — | — |
| (d-7) | Amine salt of cid phosphate (*13) | — | — | 0.05 | 0.20 | 0.20 | 0.20 | 0.20 | 0.20 | 0.20 | 0.20 |
|  | S-containing extreme pressure agent I (*14) | — | — | — | — | — | — | — | — | — | — |
|  | S-containing extreme pressure agent II (*15) | — | — | — | — | — | — | — | — | — | — |
|  | Vegetable oil (*16) | — | — | — | — | — | — | — | — | — | — |
|  | Fatty acid amide wax (*17) | — | — | — | — | — | — | — | — | — | — |
|  | MCA (*18) | — | — | — | — | — | — | — | — | — | — |
| Antiwear properties | Scar diameter (mm) | 0.40 | 0.37 | 0.34 | 0.30 | 0.30 | 0.30 | 0.30 | 0.30 | 0.30 | 0.30 |
| Extreme pressure properties | L.N.S.L(N) | 784 | 784 | 784 | 784 | 784 | 784 | 784 | 784 | 784 | 784 |
| Anti-flaking properties | Condition 1 | C | C | C | C | B | B | C | B | B | C |
|  | Condition 2 | C | C | C | C | B | A | B | A | A | C |
| Resistance to heat generation | Increase in temp. from room temp. (° C.) | 52 | 52 | 53 | 53 | 52 | 52 | 52 | 52 | 52 | 52 |

TABLE 3

|  |  | Examples |  |  |  |  |  |  |  |  |  |
|---|---|---|---|---|---|---|---|---|---|---|---|
|  |  | 21 | 22 | 23 | 24 | 25 | 26 | 27 | 28 | 29 | 30 |
| (a) | Base oil | 91.80 | 87.80 | 92.90 | 91.80 | 87.80 | 92.60 | 91.80 | 87.80 | 92.60 | 91.80 |
| (b) | Diurea thickener | 7.00 | 7.00 | 7.00 | 7.00 | 7.00 | 7.00 | 7.00 | 7.00 | 7.00 | 7.00 |
| (c-1) | Benzotriazole (*1) | — | — | — | — | — | — | — | — | — | — |
| (c-2) | Benzotriazole derivative (*2) | — | — | — | — | — | — | — | — | — | — |
| (c-3) | Benzotriazole derivative (*3) | 1.00 | 5.00 | — | — | — | — | — | — | — | — |
| (c-4) | Benzotriazole derivative (*4) | — | — | 0.20 | 1.00 | 5.00 | — | — | — | — | — |
| (c-5) | Benzotriazole derivative (*5) | — | — | — | — | — | 0.20 | 1.00 | 5.00 | — | — |
| (c-6) | Benzotriazole derivative (*6) | — | — | — | — | — | — | — | — | 0.20 | 1.00 |
| (d-1) | Tricresyl phosphate (*7) | — | — | — | — | — | — | — | — | — | — |
| (d-2) | Trioctyl phosphate (*8) | — | — | — | — | — | — | — | — | — | — |

TABLE 3-continued

|  |  | Examples | | | | | | | | | |
|---|---|---|---|---|---|---|---|---|---|---|---|
|  |  | 21 | 22 | 23 | 24 | 25 | 26 | 27 | 28 | 29 | 30 |
| (d-3) | Triphenyl phosphite (*9) | — | — | — | — | — | — | — | — | — | — |
| (d-4) | Triethyl phosphite (*10) | — | — | — | — | — | — | — | — | — | — |
| (d-5) | Acid phosphate I (*11) | — | — | — | — | — | — | — | — | — | — |
| (d-6) | Acid phosphate II (*12) | — | — | — | — | — | — | — | — | — | — |
| (d-7) | Amine salt of acid phosphate (*13) | 0.20 | 0.20 | 0.20 | 0.20 | 0.20 | 0.20 | 0.20 | 0.20 | 0.20 | 0.20 |
|  | S-containing extreme pressure agent I (*14) | — | — | — | — | — | — | — | — | — | — |
|  | S-containing extreme pressure agent II (*15) | — | — | — | — | — | — | — | — | — | — |
|  | Vegetable oil (*16) | — | — | — | — | — | — | — | — | — | — |
|  | Fatty acid amide wax (*17) | — | — | — | — | — | — | — | — | — | — |
|  | MCA (*18) | — | — | — | — | — | — | — | — | — | — |
| Antiwear properties | Scar diameter (mm) | 0.30 | 0.30 | 0.30 | 0.30 | 0.30 | 0.30 | 0.30 | 0.30 | 0.30 | 0.30 |
| Extreme pressure properties | L.N.S.L(N) | 784 | 784 | 734 | 734 | 734 | 734 | 784 | 784 | 784 | 784 |
| Anti-flaking properties | Condition 1 | B | B | C | B | B | C | B | B | C | B |
|  | Condition 2 | B | A | C | B | A | C | B | A | C | B |
| Resistance to heat generation | Increase in temp. from room temp. (° C.) | 52 | 52 | 52 | 52 | 52 | 52 | 52 | 52 | 52 | 52 |

TABLE 4

|  |  | Examples | | | | | | | | | |
|---|---|---|---|---|---|---|---|---|---|---|---|
|  |  | 31 | 32 | 33 | 34 | 35 | 36 | 37 | 38 | 39 | 40 |
| (a) | Base oil | 87.80 | 91.70 | 91.30 | 91.70 | 91.30 | 91.75 | 90.30 | 91.20 | 91.75 | 90.30 |
| (b) | Diurea thickener | 7.00 | 7.00 | 7.00 | 7.00 | 7.00 | 7.00 | 7.00 | 7.00 | 7.00 | 7.00 |
| (c-1) | Benzotriazole (*1) | — | — | — | — | — | 0.20 | — | — | 0.20 | — |
| (c-2) | Benzotriazole derivative (*2) | — | 1.00 | 1.00 | 1.00 | 1.00 | — | 1.00 | 1.00 | — | 1.00 |
| (c-3) | Benzotriazole derivative (*3) | — | — | — | — | — | — | — | — | — | — |
| (c-4) | Benzotriazole derivative (*4) | — | — | — | — | — | — | — | — | — | — |
| (c-5) | Benzotriazole derivative (*5) | — | — | — | — | — | — | — | — | — | — |
| (c-6) | Benzotriazole derivative (*6) | 5.00 | — | — | — | — | — | — | — | — | — |
| (d-1) | Tricresyl phosphate (*7) | — | — | — | — | — | 0.05 | — | — | 0.05 | — |
| (d-2) | Trioctyl phosphate (*8) | — | — | — | — | — | — | — | — | — | — |
| (d-3) | Triphenyl phosphite (*9) | — | — | — | — | — | — | — | — | — | — |
| (d-4) | Triethyl phosphite (*10) | — | — | — | — | — | — | — | — | — | — |
| (d-5) | Acid phosphate I (*11) | — | — | — | — | — | — | — | — | — | — |
| (d-6) | Acid phosphate II (*12) | — | — | — | — | — | — | — | — | — | — |
| (d-7) | Amine salt of acid phosphate (*13) | 0.20 | 0.20 | 0.20 | 0.20 | 0.20 | — | 0.20 | 0.20 | — | 0.20 |
|  | S-containing extreme pressure agent I (*14) | — | 0.10 | 0.50 | — | — | — | — | — | — | — |
|  | S-containing extreme pressure agent II (*15) | — | — | — | 0.10 | 0.50 | — | 0.50 | 0.50 | — | 0.50 |
|  | Vegetable oil (*16) | — | — | — | — | — | 1.00 | 1.00 | 0.10 | — | — |
|  | Fatty acid amide wax (*17) | — | — | — | — | — | — | — | — | 1.00 | 1.00 |
|  | MCA (*18) | — | — | — | — | — | — | — | — | — | — |
| Antiwear properties | Scar diameter (mm) | 0.30 | 0.30 | 0.30 | 0.30 | 0.30 | 0.40 | 0.30 | 0.30 | 0.40 | 0.30 |
| Extreme pressure properties | L.N.S.L (N) | 784 | 981 | 981 | 981 | 981 | 784 | 981 | 981 | 784 | 981 |
| Anti-flaking properties | Condition 1 | B | A | A | A | A | C | A | A | C | A |
|  | Condition 2 | A | A | A | A | A | C | A | A | C | A |
| Resistance to heat generation | Increase in temp. from room temp. (° C.) | 52 | 52 | 52 | 52 | 52 | 37 | 37 | 41 | 40 | 39 |

TABLE 5

|  |  | Examples | | | |
|---|---|---|---|---|---|
|  |  | 41 | 42 | 43 | 44 |
| (a) | Base oil | 91.20 | 92.50 | 91.05 | 91.20 |
| (b) | Diurea thickener | 7.00 | 7.00 | 7.00 | 7.00 |
| (c-1) | Benzotriazole (*1) | — | 0.20 | — | — |
| (c-2) | Benzotriazole derivative (*2) | 1.00 | — | 1.00 | 1.00 |
| (c-3) | Benzotriazole derivative (*3) | — | — | — | — |
| (c-4) | Benzotriazole derivative (*4) | — | — | — | — |
| (c-5) | Benzotriazole derivative (*5) | — | — | — | — |

TABLE 5-continued

|  |  | Examples | | | |
| --- | --- | --- | --- | --- | --- |
|  |  | 41 | 42 | 43 | 44 |
| (c-6) | Benzotriazole derivative (*6) | — | — | — | — |
| (d-1) | Tricresyl phosphate (*7) | — | 0.05 | — | — |
| (d-2) | Trioctyl phosphate (*8) | — | — | — | — |
| (d-3) | Triphenyl phosphite (*9) | — | — | — | — |
| (d-4) | Triethyl phosphite (*10) | — | — | — | — |
| (d-5) | Acid phosphate I (*11) | — | — | — | — |
| (d-6) | Acid phosphate II (*12) | — | — | — | — |
| (d-7) | Amine salt of acid phosphate (*13) | 0.20 | — | 0.20 | 0.20 |
|  | S-containing extreme pressure agent I (*14) | — | — | — | — |
|  | S-containing extreme pressure agent II (*15) | 0.50 | — | 0.50 | 0.50 |
|  | Vegetable oil (*16) | — | — | — | — |
|  | Fatty acid amide wax (*17) | 0.10 | — | — | 0.10 |
|  | MCA (*18) | — | 0.25 | 0.25 | 0.10 |
| Antiwear properties | Scar diameter (mm) | 0.30 | 0.46 | 0.38 | 0.34 |
| Extreme pressure properties | L.N.S.L (N) | 981 | 784 | 981 | 981 |
| Anti-flaking properties | Condition 1 | A | C | A | A |
|  | Condition 2 | A | C | A | A |
| Resistance to heat generation | Increase in temp. from room temp. (° C.) | 44 | 36 | 36 | 40 |

TABLE 6

|  |  | Comparative Examples | | | | | | |
| --- | --- | --- | --- | --- | --- | --- | --- | --- |
|  |  | 1 | 2 | 3 | 4 | 5 | 6 | 7 |
| (a) | Base oil | 93.00 | 92.00 | 92.80 | 90.00 | 90.00 | 90.00 | 90.00 |
| (b) | Diurea thickener | 7.00 | 7.00 | 7.00 | 7.00 | 7.00 | 7.00 | 7.00 |
| (c-1) | Benzotriazole (*1) | — | — | — | — | — | — | — |
| (c-2) | Benzotriazole derivative (*2) | — | 1.00 | — | 1.00 | 1.00 | 1.00 | 1.00 |
| (c-3) | Benzotriazole derivative (*3) | — | — | — | — | — | — | — |
| (c-4) | Benzotriazole derivative (*4) | — | — | — | — | — | — | — |
| (c-5) | Benzotriazole derivative (*5) | — | — | — | — | — | — | — |
| (c-6) | Benzotriazole derivative (*6) | — | — | — | — | — | — | — |
| (d-1) | Tricresyl phosphate (*7) | — | — | — | — | — | — | — |
| (d-2) | Trioctyl phosphate (*8) | — | — | — | — | — | — | — |
| (d-3) | Triphenyl phosphite (*9) | — | — | — | — | — | — | — |
| (d-4) | Triethyl phosphite (*10) | — | — | — | — | — | — | — |
| (d-5) | Acid phosphate I (*11) | — | — | — | — | — | — | — |
| (d-6) | Acid phosphate II (*12) | — | — | — | — | — | — | — |
| (d-7) | Amine salt of acid phosphate (*13) | — | — | 0.20 | — | — | — | — |
|  | S-containing extreme pressure agent I (*14) | — | — | — | — | — | — | — |
|  | S-containing extreme pressure agent II (*15) | — | — | — | 2.00 | — | — | — |
|  | Vegetable oil (*16) | — | — | — | — | 2.00 | — | — |
|  | Fatty acid amide wax (*17) | — | — | — | — | — | — | — |
|  | MCA (*18) | — | — | — | — | — | — | — |
|  | Zinc dialkyldithiocarbamate (*19) | — | — | — | — | — | 2.00 | — |
|  | Graphite (*20) | — | — | — | — | — | — | 2.00 |
| Antiwear properties | Scar diameter (mm) | 0.60 | 0.60 | 0.30 | 0.60 | 0.60 | 0.56 | 0.62 |
| Extreme pressure properties | L.N.S.L(N) | 618 | 618 | 784 | 784 | 618 | 618 | 618 |
| Anti-flaking properties | Condition 1 | D | D | D | D | D | D | D |
|  | Condition 2 | D | B | D | B | B | B | B |
| Resistance to heat generation | Increase in temp. from room temp. (° C.) | 58 | 56 | 56 | 55 | 38 | 54 | 56 |

TABLE 7

|   |   | Comparative Examples | | | |
|---|---|---|---|---|---|
|   |   | 8 | 9 | 10 | 11 |
| (a) | Base oil | 90.80 | 90.80 | 90.80 | 90.80 |
| (b) | Diurea thickener | 7.00 | 7.00 | 7.00 | 7.00 |
| (c-1) | Benzotriazole (*1) | — | — | — | — |
| (c-2) | Benzotriazole derivative (*2) | — | — | — | — |
| (c-3) | Benzotriazole derivative (*3) | — | — | — | — |
| (c-4) | Benzotriazole derivative (*4) | — | — | — | — |
| (c-5) | Benzotriazole derivative (*5) | — | — | — | — |
| (c-6) | Benzotriazole derivative (*6) | — | — | — | — |
| (d-1) | Tricresyl phosphate (*7) | — | — | — | — |
| (d-2) | Trioctyl phosphate (*8) | — | — | — | — |
| (d-3) | Triphenyl phosphite (*9) | — | — | — | — |
| (d-4) | Triethyl phosphite (*10) | — | — | — | — |
| (d-5) | Acid phosphate I (*11) | — | — | — | — |
| (d-6) | Acid phosphate II (*12) | — | — | — | — |
| (d-7) | Amine salt of acid phosphate I (*13) | 0.20 | 0.20 | 0.20 | 0.20 |
|   | S-containing extreme pressure agent I (*14) | — | — | — | — |
|   | S-containing extreme pressure agent II (*15) | 2.00 | — | — | — |
|   | Vegetable oil (*16) | — | 2.00 | — | — |
|   | Fatty acid amide wax (*17) | — | — | — | — |
|   | MCA (*18) | — | — | — | — |
|   | Zinc dialkyldithiocarbamate (*19) | — | — | 2.00 | — |
|   | Graphite (*20) | — | — | — | 2.00 |
| Antiwear properties | Scar diameter (mm) | 0.30 | 0.30 | 0.30 | 0.40 |
| Extreme pressure properties | L.N.S.L (N) | 981 | 784 | 784 | 784 |
| Anti-flaking properties | Condition 1 | D | D | D | D |
|   | Condition 2 | D | D | D | D |
| Resistance to heat | Increase in temp. from room temp. (° C.) | 54 | 38 | 56 | 55 |

(*1) In the formula (1), $R^1$ and $R^3$ both represent H. (BT-120, made by JOHOKU Chemical Co., Ltd.)
(*2) In the formula (1), $R^1$ is $CH_3$ and $R^3$ is $CH_2N(C_8H_{17})_2$. (VERZONE OA-386, made by Daiwa Fine Chemicals Co., Ltd. (Laboratory))
(*3) In the formula (2), $R^9$ is H and $R^{10}$ is $CH_3$. (JF-77, made by JOHOKU Chemical Co., Ltd.)
(*4) In the formula (2), $R^9$ and $R^{10}$ both represent $C_5H_{11}$. (JF-80, made by JOHOKU Chemical Co., Ltd.)
(*5) In the formula (3), $R^{10}$ is H, $R^{11}$ is $N_3C_6H_4$, and $R^{12}$ is $C_8H_{17}$. (JF-832, made by JOHOKU Chemical Co., Ltd.)
(*6) In the formula (3), $R^{10}$ is H, $R^{11}$ is $C_4H_9$, and $R^{12}$ is $CH_3$. (JAST-500, made by JOHOKU Chemical Co., Ltd.)
(*7) $O=P(OC_6H_4CH_3)_3$ (DURAD TCP, made by Ajinomoto Fine-Techno Co., Ltd.)
(*8) $O=P(OC_8H_{17})_3$ (TOP, made by DAIHACHI Chemical Industry Co., Ltd.)
(*9) $P(OC_6H_5)_3$ (JP-360, made by JOHOKU Chemical Co., Ltd.)
(*10) $P(OC_2H_5)_3$ (JP-302, made by JOHOKU Chemical Co., Ltd.)
(*11) $O=PH(OC_6H_5)_2$ (JP-260, made by JOHOKU Chemical Co., Ltd.)
(*12) $O=PH(OC_2H_5)_2$ (JP-202, made by JOHOKU Chemical Co., Ltd.)
(*13) VANLUBE 672, made by R.T. Vanderbilt Company, Inc.
(*14) DAILUBE S-285, made by DIC Corporation
(*15) ANGLAMOL 33, made by The Lubrizol Corporation
(*16) Castor oil No. 1 (Industrial grade), made by HOKOKU Co., Ltd.
(*17) ARMOSLIP HT Powder, made by Lion Akzo Co., Ltd.
(*18) MELAPUR MC25, made by BASF Japan
(*19) VANLUBE AZ, made by R.T. Vanderbilt Company, Inc.
(*20) AG-5, made by Fujikokuen Kogyo Co., Ltd.

The grease compositions of Examples 1 to 44 show excellent antiwear properties and anti-flaking properties.

The grease compositions of Examples 32 to 35 comprising the sulfur-containing extreme-pressure agent in addition to the components (a) to (d) are also excellent in the extreme pressure properties, and show further improved anti-flaking properties.

The grease compositions of Examples 36, 39 and 42 comprising the vegetable oil, fatty acid amide wax or MCA in addition to the components (a) to (d) are also excellent in the resistance to heat generation.

The grease compositions of Examples 37, 38, 40, 41, 43 and 44 comprising the vegetable oil, fatty acid amide wax or MCA and the sulfur-containing extreme-pressure agent in addition to the components (a) to (d) are excellent in the antiwear properties, the extreme pressure properties, the anti-flaking properties, and also the resistance to heat generation.

Among the grease compositions of Examples 36 to 44 comprising the vegetable oil, fatty acid amide wax or MCA, those of Examples 36 to 38 and those of 42 to 44 respectively comprising the vegetable oil and MCA particularly show the excellent resistance to heat generation. The grease composition of Examples 42 to 44 comprising the MCA show the most preferable resistance to heat generation, but the antiwear properties are slightly inferior.

The comparative grease composition of Comparative Example 1 comprising neither the component (c) nor the component (d) show insufficient anti-flaking properties.

The comparative grease composition of Comparative Example 2 corresponds to the grease composition disclosed in JP 2003-82374 A. The grease compositions of Comparative Examples 2 and 4 to 7 free of the component (d) show insufficient antiwear properties and unsatisfactory anti-flaking properties under the high load conditions (conditions 1) although the grease composition comprises a typical extreme-pressure agent in Comparative Example 4, a typical oiliness improver in Comparative Example 5, a typical antiwear agent in Comparative Example 6, and a typical solid lubricant in Comparative Example 7. The wear became more serious under the high load conditions (conditions 1) than under the low load conditions (conditions 2). This is considered to result from higher contact pressure under the high load conditions. When the antiwear properties are insufficient, wear of the inner joint member and the outer joint member becomes more serious, so that the balls as the rolling elements may leave the tracks of the inner and outer joint members to run onto the edge of the tracks, and the cage pocket may be abnormally worn out to create unsteady contact. These problems may result in serious flaking, which cannot be prevented in Comparative Examples.

The grease compositions of Comparative Examples 3 and 8 to 11 free of the component (c) show insufficient anti-flaking properties because the damages leading to the flaking problem cannot be securely prevented, although the grease composition comprises a typical extreme-pressure agent in Comparative Example 8, a typical oiliness improver in Comparative Example 9, a typical anti-wear agent in Comparative Example 10, and a typical solid lubricant in Comparative Example 11. The benzotriazole and/or the derivative thereof is considered to exhibit the effect of inhibiting the corrosion of copper and copper alloys. The benzotriazole and/or the derivative thereof can effectively form a benzotriazole film on the base where copper turns into densely bonded copper oxide. Similarly to the base of steel, the benzotriazole and/or the derivative thereof can form an advantageous film on the iron oxide to protect the rigid and dense iron oxide and prevent the seed of damages.

EXPLANATION OF NUMERALS

1 Shaft
2 Boots
3 Grease
10 Outer joint member
11 Spherical inner surface
12 Outer joint member track groove
20 Inner joint member
21 Spherical outer surface
22 Inner joint member track groove
30 Torque transmitting ball
40 Cage
41 Spherical surfaces
43 Pocket

The invention claimed is:
1. A grease composition for constant velocity joints, comprising;
(a) a base oil being mineral oil having a kinematic viscosity at 40° C. of 50 to 330 mm²/s,
(b) a diurea thickener,
(c) benzotriazole and/or a derivative thereof wherein the benzotriazole and/or a derivative thereof is the compound represented by formula (1)

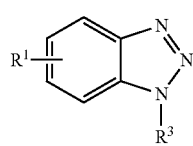

(1)

wherein $R^1$ represents an alkyl group having 1 to 18 carbon atoms and $R^3$ represents $CH_2NR^5R^6$ in which $R^5$ and $R^6$ are each independently an alkyl group having 1 to 18 carbon atoms,
(d) a phosphate and/or an amine salt thereof, and
a castor oil in an amount of 0.25 to 1% by mass based on the total mass of the composition.

2. The grease composition for constant velocity joints of claim 1, wherein the benzotriazole and/or the derivative thereof (c) is contained in an amount of 0.2 to 20 mass % based on the total mass of the composition.

3. The grease composition for constant velocity joints of claim 1, wherein the phosphate and/or the amine salt thereof (d) is contained in an amount of 0.05 to 10 mass % based on the total mass of the composition.

4. A constant velocity joint charged with the grease composition for constant velocity joints of claim 1.

5. The grease composition for constant velocity joints of claim 1, wherein the diurea thickener (b) is contained in an amount of 1 to 25 mass % based on the total mass of the composition.

6. The grease composition for constant velocity joints of claim 1, further comprising at least one selected from the group consisting of vegetable fats and oils other than castor oil, fatty acid amide waxes, and melamine cyanurate.

7. The grease composition for constant velocity joints of claim 6, wherein said at least one selected from the group consisting of vegetable fats and oils other than castor oil, fatty acid amide waxes, and melamine cyanurate is contained in an amount of 0.1 to 10 mass % based on the total mass of the composition.

8. The grease composition for constant velocity joints of claim 1, further comprising zinc dialkyldithiocarbamate.

9. The grease composition for constant velocity joints of claim 8, wherein zinc dialkyldithiocarbamate is contained in an amount of 0.0001 to 10% by mass based on the total mass of the composition.

10. The grease composition for constant velocity joints of claim 1, further comprising graphite.

11. The grease composition for constant velocity joints of claim 10, wherein graphite is contained in an amount of 0.0001 to 10% by mass based on the total mass of the composition.

12. The grease composition for constant velocity joints of claim 1, wherein the mineral oil is paraffin oil.

13. The grease composition for constant velocity joints of claim 1, wherein phosphate and/or the amine salts thereof (d) is selected from the group consisting of the phosphates, phosphites, hypophosphites, amine salts of acid phosphates, amine salts of acid phosphites, and amine salts of acid hypophosphites.

14. A grease composition for constant velocity joints, consisting essentially of:
(a) a paraffin type mineral oil as a base oil;
(b) a diurea thickener represented by the formula (4):

$R^{13}$—NH—CO—NH—$C_6H_4$-$p$-$CH_2$—$C_6H_4$-$p$-NH—CO—NHR$^{14}$ (4)

wherein $R^{13}$ and $R^{14}$ both represent a straight-chain alkyl group having 8 carbon atoms;
(c) a benzotriazole derivative represented by the formula (1):

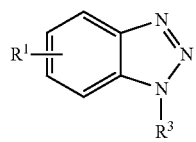 (1)

wherein $R^1$ is a halogen atom or an alkyl group having 1 to 4 carbon atoms, and $R^3$ is a halogen atom or $CH_2NR^5R^6$ in which $R^5$ and $R^6$ are each independently a hydrogen atom or an alkyl group having 1 to 8 carbon atoms;

(d) an amine salt of an acid phosphate represented by the formula (5):

$$R^{15}O_APO(OH)_{3-A} \qquad (5)$$

wherein $R^{15}$ is an alkyl group having 1 to 4 carbon atoms, and A is 1 or 2 an olefin sulfide, castor oil, and a rust inhibitor, wherein the grease composition has a worked penetration determined by the JIS K 2220 5.3 of 265 to 385.

15. The grease composition for constant velocity joints of claim 14, wherein the content of the component (c) is 1 to 5 mass %, the content of the component (d) is 0.2 to 5 mass %, and the content of the sulfur-containing extreme-pressure agent is 0.1 to 5 mass %, the content of the castor oil is 0.25 to 1 mass %, and the content of the rust inhibitor is 0.05 to 1 mass %.

* * * * *

UNITED STATES PATENT AND TRADEMARK OFFICE
CERTIFICATE OF CORRECTION

PATENT NO. : 10,612,601 B2
APPLICATION NO. : 15/101236
DATED : April 7, 2020
INVENTOR(S) : Michitaka Yoshihara It is certified that error appears in the above-identified patent and that said Letters Patent is hereby corrected as shown below:

On the Title Page

Below the Abstract insert the following:
--16 Claims, 1 Drawing Sheet--

In the Claims

Column 19, Line 50 - Column 20, Line 8:
"1. A grease composition for constant velocity joints, comprising;
    (a) a base oil being mineral oil having a kinematic viscosity at 40°C. of 50 to 330 mm$^2$/s,
    (b) a diurea thickener,
    (c) benzotriazole and/or a derivative thereof wherein the benzotriazole and/or a derivative thereof is the compound represented by formula (1)

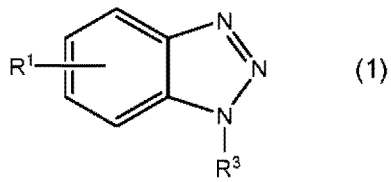

wherein $R^1$ represents an alkyl group having 1 to 18 carbon atoms and $R^3$ represents $CH_2NR^5R^6$ in which $R^5$ and $R^6$ are each independently an alkyl group having 1 to 18 carbon atoms,
    (d) a phosphate and/or an amine salt thereof, and
    a castor oil in an amount of 0.25 to 1% by mass based on the total mass of the composition."
should read:
--1. A grease composition for constant velocity joints, comprising;
    (a) a base oil having a kinematic viscosity at 40° C. of 50 to 330 mm$^2$/s,
    (b) a diurea thickener, Signed and Sealed this
Eighteenth Day of August, 2020

Andrei Iancu
*Director of the United States Patent and Trademark Office*

(c) benzotriazole and/or a derivative thereof wherein the benzotriazole and/or a derivative thereof is

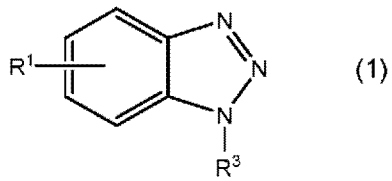

the compound represented by formula (1)
wherein $R^1$ represents an alkyl group having 1 to 18 carbon atoms and $R^3$ represents $CH2NR^5R^6$ in which $R^5$ and $R^6$ are each independently an alkyl group having 1 to 18 carbon atoms, (d) a phosphate and/or an amine salt thereof, and
a castor oil in an amount of 0.1 to 10 % by mass based on the total mass of the composition.--

Column 20, Lines 23-27:
"6. The grease composition for constant velocity joints of claim 1, further comprising at least one selected from the group consisting of vegetable fats and oils other than castor oil, fatty acid amide waxes, and melamine cyanurate." should read:
-6. The grease composition for constant velocity joints of claim 1, further comprising at least one selected from the group consisting of vegetable fats and oils, fatty acid amide waxes, and melamine cyan urate.-

Column 20, Lines 28-33:
"7. The grease composition for constant velocity joints of claim 6, wherein said at least one selected from the group consisting of vegetable fats and oils other than castor oil, fatty acid amide waxes, and melaminecyanurate is contained in an amount of 0.1 to 10 mass % based on the total mass of the composition." should read:
-7. The grease composition for constant velocity joints of claim 6, wherein said at least one selected from the group consisting of vegetable fats and oils, fatty acid amide waxes, and melamine cyanurate is contained in an amount of 0.1 to 10 mass% based on the total mass of the composition.-

Column 20, before Line 47, insert:
-12. The grease composition for constant velocity joints of claim 1, wherein the base oil is a mineral oil.—
Column 20, Lines 47-48:
"12. The grease composition for constant velocity joints of claim 1, wherein the mineral oil is paraffin oil." should read:
-13. The grease composition for constant velocity joints of claim 12, wherein the mineral oil is paraffin oil.—

Column 20, Lines 49-55:
"13. The grease composition for constant velocity joints of claim 1, wherein phosphate and/or the amine salts thereof (d) is selected from the group consisting of the phosphates, phosphites, hypophosphites, amine salts of acid phosphates, amine salts of acid phosphites, and amine salts of acid hypophosphites."
should read:
-14. The grease composition for constant velocity joints of claim 1, wherein phosphate and/or the amine salts thereof (d) is selected from the group consisting of the phosphates, phosphites, hypophosphites, amine salts of acid phosphates, amine salts of acid phosphites, and amine salts of acid hypophosphites.-

Column 20, Line 56 -- Column 21, Line 24:
"14. A grease composition for constant velocity joints, consisting essentially of:
(a) a paraffin type mineral oil as a base oil;
(b) a diurea thickener represented by the formula (4):
$R^{13}$-NH-CO-NH-$C_6H_4$-p-CH2-$C_6H_4$-p-NH-CO-NH$R^{14}$ (4) wherein $R^{13}$ and $R^{14}$ both represent a straight-chain alkyl group having 8 carbon atoms;
(c) a benzotriazole derivative represented by the formula (1):

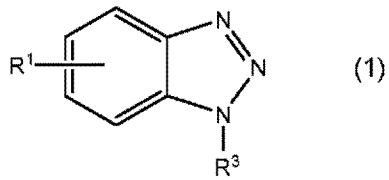

(1)

wherein $R^1$ is a halogen atom or an alkyl group having 1 to 4 carbon atoms, and $R^3$ is a halogen atom or CH2N$R^5R^6$ in which $R^5$ and $R^6$ are each independently a hydrogen atom or an alkyl group having 1 to 8 carbon atoms;
(d) an amine salt of an acid phosphate represented by the formula (5): $R^{15}O_aPO(OH)_{3-a}$ (5) wherein $R^{15}$ is an alkyl group having 1 to 4 carbon atoms, and A is 1 or 2 an olefin sulfide, castor oil, and a rust inhibitor,
wherein the grease composition has a worked penetration determined by the JIS K 2220 5.3 of 265 to 385." should read:
-15. A grease composition for constant velocity joints, consisting essentially of:
(a) a paraffin type mineral oil as a base oil;
(b) a diurea thickener represented by the formula (4):
$R^{13}$-NH-CO-NH-$C_6H_4$-p-CH2-$C_6H_4$-p-NH-CO-NH$R^{14}$ (4) wherein $R^{13}$ and $R^{14}$ both represent a straight-chain alkyl group having 8 carbon atoms;

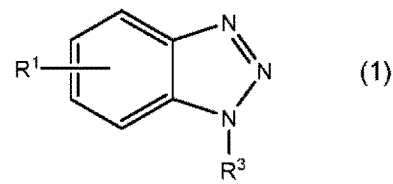

(1)

(c) a benzotriazole derivative represented by the formula (1):
wherein $R^1$ is a halogen atom or an alkyl group having 1 to 4 carbon atoms, and $R^3$ is a halogen atom or CH2N$R^5R^6$ in which $R^5$ and $R^6$ are each independently a hydrogen atom or an alkyl group having 1 to 8 carbon atoms;
(d) an amine salt of an acid phosphate represented by the formula (5): $R^{15}O_aPO(OH)_{3-a}$ (5) wherein $R^{15}$ is an alkyl group having 1 to 4 carbon atoms, and A is 1 or 2 an olefin sulfide, castor oil, and a rust inhibitor,
wherein the grease composition has a worked penetration determined by the JIS K 2220 5.3 of 265 to 385.--

Column 21, Lines 25-31:
"15. The grease composition for constant velocity joints of claim 14, wherein the content of the component (c) is 1 to 5 mass%, the content of the component (d) is 0.2 to 5 mass%, and the content of

CERTIFICATE OF CORRECTION (continued)
U.S. Pat. No. 10,612,601 B2 the sulfurcontaining extreme-pressure agent is 0.1 to 5 mass%, the content of the castor oil is 0.25 to 1 mass%, and the content of the rust inhibitor is 0.05 to 1 mass%." should read:
-16. The grease composition for constant velocity joints of claim 15, wherein the content of the component (c) is 1 to 5 mass%, the content of the component (d) is 0.2 to 5 mass%, and the content of the sulfur-containing extreme-pressure agent is 0.1 to 5 mass%, the content of the castor oil is 0.25 to 1 mass%, and the content of the rust inhibitor is 0.05 to 1 mass%.--